(12) United States Patent
Woodworth et al.

(10) Patent No.: US 12,261,752 B2
(45) Date of Patent: Mar. 25, 2025

(54) OUT-OF-BAND COMMUNICATIONS FOR CUSTOMER PREMISES EQUIPMENT

(71) Applicant: CenturyLink Intellectual Property LLC, Broomfield, CO (US)

(72) Inventors: John R. B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 203 days.

(21) Appl. No.: 18/327,508

(22) Filed: Jun. 1, 2023

(65) Prior Publication Data

US 2023/0396522 A1  Dec. 7, 2023

Related U.S. Application Data

(60) Provisional application No. 63/365,981, filed on Jun. 7, 2022.

(51) Int. Cl.
| | |
|---|---|
| *H04L 43/0817* | (2022.01) |
| *H04L 41/0654* | (2022.01) |
| *H04L 41/344* | (2022.01) |
| *H04L 41/5067* | (2022.01) |
| *H04L 43/0811* | (2022.01) |

(52) U.S. Cl.
CPC ...... *H04L 41/5067* (2013.01); *H04L 41/0654* (2013.01); *H04L 41/344* (2022.05); *H04L 43/0811* (2013.01); *H04L 43/0817* (2013.01)

(58) Field of Classification Search
CPC ... H04L 12/12; H04L 41/0654; H04L 41/344; H04L 41/5067; H04L 41/22; H04L 41/40; H04L 43/0811; H04L 43/0817; H04L 43/0852; H04L 67/125; Y02D 30/70; G06F 11/3495; G16Y 30/00; H04W 16/225; H04W 76/18; H04W 8/005; H04W 8/22
See application file for complete search history.

(56) References Cited

U.S. PATENT DOCUMENTS

| | | | |
|---|---|---|---|
| 2020/0252295 A1* | 8/2020 | Nolan | H04W 8/005 |
| 2021/0100058 A1* | 4/2021 | Chatterjee | H04W 76/18 |
| 2021/0105848 A1* | 4/2021 | Jung | H04W 16/225 |
| 2021/0111974 A1* | 4/2021 | Tayeb | G06F 11/3495 |
| 2021/0328933 A1* | 10/2021 | Thyagaturu | H04L 41/40 |
| 2022/0294664 A1* | 9/2022 | Quillien | H04L 67/125 |
| 2022/0303759 A1* | 9/2022 | Vaizman | H04W 8/22 |
| 2022/0357939 A1* | 11/2022 | Ward | G16Y 30/00 |
| 2023/0155910 A1* | 5/2023 | Mang | H04L 41/22 |
| | | | 709/224 |
| 2023/0318936 A1* | 10/2023 | Kolar | H04L 43/0852 |
| | | | 709/224 |

* cited by examiner

*Primary Examiner* — Le H Luu

(57) ABSTRACT

Customer premises equipment, such as a gateway device, for making a connection to an Internet service provider (ISP) may on occasion be defective or improperly set up, and in such circumstances remote troubleshooting by a technician employed by the Internet service provider may be hampered by the absence of a connection to the customer premises equipment. As such, a system and method for providing a secondary link to customer premises equipment are provided.

20 Claims, 5 Drawing Sheets

OUT-OF-BAND COMMUNICATIONS FOR CUSTOMER PREMISES EQUIPMENT

CROSS-REFERENCE TO RELATED APPLICATIONS

This application claims the benefit of U.S. Provisional Application No. 63/365,981 filed Jun. 7, 2022, entitled "Out-of-Band Communications for Customer Premises Equipment," which is incorporated herein by reference in its entirety.

FIELD

One or more aspects of examples according to the present disclosure relate to customer premises equipment for wide-area network (e.g., Internet) access, and more particularly to a system and method for providing a secondary link to customer premises equipment for Internet access.

BACKGROUND

Customer premises equipment for making a connection to, e.g., an Internet service provider (ISP) may on occasion be defective or improperly set up, and in such circumstances remote troubleshooting by a technician employed by the Internet service provider may be hampered by the absence of a connection to the customer premises equipment.

It is with respect to this general technical environment that aspects of the present disclosure are related.

SUMMARY

A system and method for providing a secondary link to customer premises equipment for Internet access is provided. In an aspect, an Internet-access device may include a primary transceiver and a secondary transceiver. The primary transceiver may be configured to connect a local device to an Internet service provider, and the secondary transceiver may be configured to send telemetry, regarding a state of the Internet-access device, to the Internet service provider.

In another aspect, a method performed by an Internet-access device comprising a primary transceiver and a secondary transceiver is provided. In examples, the method comprises: sending, by the secondary transceiver, telemetry, regarding a state of the Internet-access device, to an Internet service provider via a low-power radio transmission; after sending the telemetry, connecting the Internet-access device to a local device; receiving an Internet protocol (IP) packet from the local device; and sending the IP packet to the Internet service provider via the primary receiver.

In another aspect, a method is provided, comprising: storing a device identifier in association with a customer account identifier, the device identifier identifying a secondary transceiver of an Internet-access device comprising a primary transceiver and the secondary transceiver; receiving a presence signal from the secondary transceiver, the presence signal including the device identifier; storing information of the presence signal, including a radio path via which the presence signal was received; receiving an indication that a customer needs assistance with the Internet-access device; correlating the customer with the device identifier through the customer account identifier; and determining, from the stored information: a state of the Internet-access device, or a radio path for querying the Internet-access device for state telemetry.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

These and other features and advantages of the present disclosure will be appreciated and understood with reference to the specification, claims, and appended drawings. Non-limiting and non-exhaustive examples are described with reference to the following Figures.

DETAILED DESCRIPTION

The detailed description set forth below in connection with the appended drawings is intended as a description of exemplary embodiments of a system and method for providing a secondary link to customer premises equipment for Internet access provided in accordance with the present disclosure and is not intended to represent the only forms in which the present disclosure may be constructed or utilized.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

Figure 1:
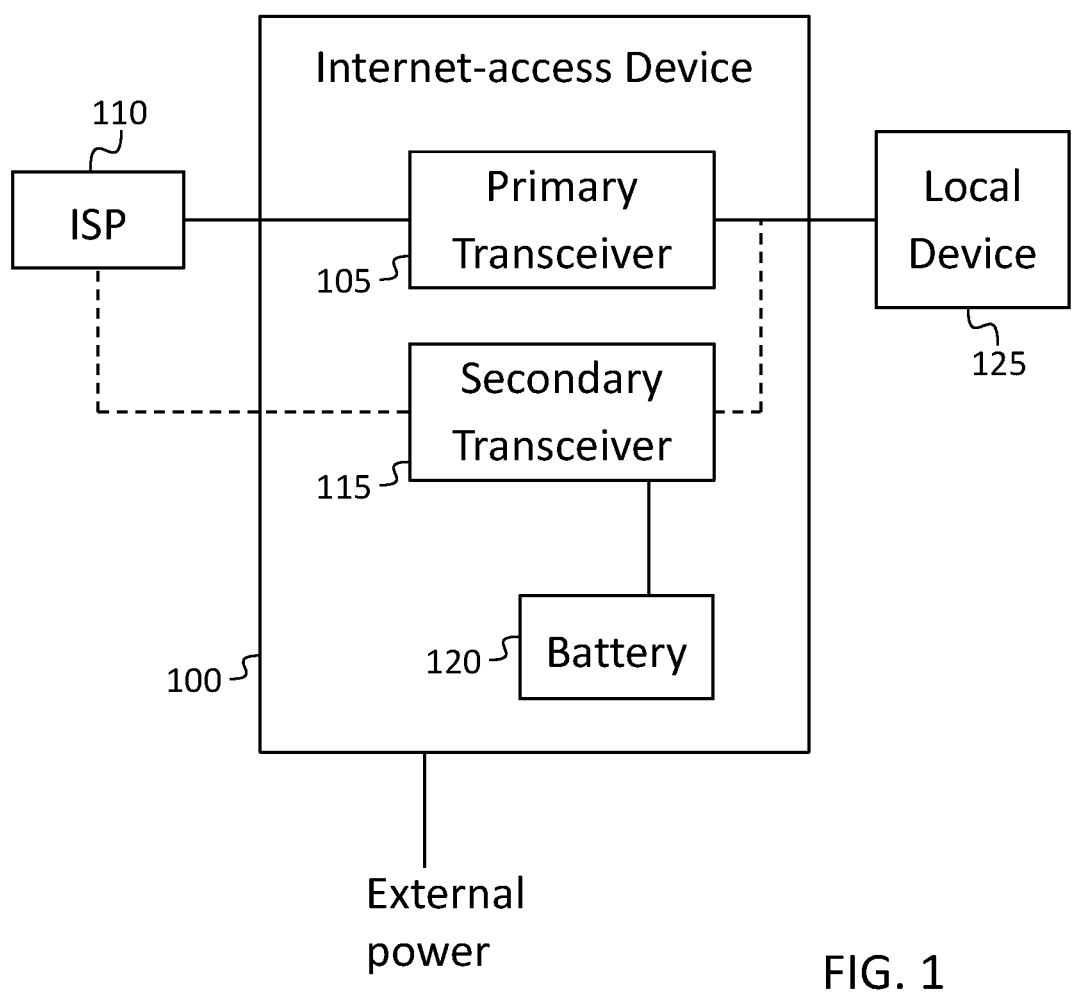
FIG. 1 is a block diagram of an Internet-access device, an Internet service provider, and a local device, according to an example of the present disclosure.

Referring to FIG. 1, a local device 125 may be connected or connectable to the Internet using an Internet-access device 100, also referred to as "customer premises equipment" (CPE), including, e.g., a transceiver, such as "primary transceiver" 105 (e.g., a Digital Subscriber Line (DSL) modem or a cable modem) connected to an Internet service provider (ISP) 110. For example, the Internet-access device 100 may comprise a gateway device that is a combination of a router (e.g., to enable a wireless local area network over which the Internet-access device 100 and local device 125 may communicate) and a modem that includes the primary transceiver 105. In other examples, the Internet-access device 100 may comprise only a modem that is connected or connectable to a separate router or that is used independent of any router. A user may be unfamiliar with the details of the internal operation of the Internet-access device 100, and, as such, may encounter difficulties in configuring the Internet-access device 100 to operate as intended. Moreover, as mentioned above, the absence of a connection between the Internet service provider 110 and the Internet-access device 100 when the Internet-access device 100 is not fully operational may hinder attempts at troubleshooting by a remote technician. Such difficulties may be remedied, for example, by sending a technician to the user's location to troubleshoot and correct any problems with the Internet-access device 100 or its setup, but the sending of a technician may be costly and may be inconvenient for the user.

In some examples, therefore, the Internet-access device 100 may be equipped with an additional transceiver, e.g., "secondary transceiver" 115, which may be connected to the Internet service provider 110 by a secondary, "out of band" connection separate from the connection between the primary transceiver 105 and the Internet service provider 110. The connection to the Internet service provider 110 through the secondary transceiver 115 may be one that does not require user participation to be established, and, as such, it may be available to a remote technician who may be helping the user set up the Internet-access device 100. In some examples, the secondary transceiver 115 is capable of being powered by a battery 120, and it may be activated and operating when (or before) the Internet-access device 100 is delivered (e.g., shipped) to the user. In addition, the battery may be rechargeable via an external power source that otherwise powers the Internet-access device 100 so that the battery is fully charged in case of a loss of power from the external power source. In operation, the primary transceiver 105 may provide a connection to the Internet for a local device 125 (which may be, e.g., a computer, smart phone, or another Internet-capable user device, such as an Internet of Things (IoT) device).

In some examples, the secondary transceiver 115 is a low-power, sub-GHz transceiver such as a LORA™ or DASH7 transceiver. The secondary transceiver 115 may, during troubleshooting of the setup of the Internet-access device 100, send to the Internet service provider 110 telemetry regarding the state of the Internet-access device 100 (which may also be referred to as "state telemetry"). Such state telemetry may include, for example, (i) whether the Internet-access device is connected to an external power source, (ii) a signal level of a signal received, from the Internet service provider, by the primary transceiver 105, and (iii) whether a device (such as local device 125) on a local area network is connected to the primary transceiver. Such state telemetry may allow a remote technician to determine, for example, that the absence of a power connection, an inadequate signal (e.g., a DSL signal or a cable signal that is too weak) from the Internet service provider 110, in incorrect (or absent) connection between the primary transceiver 105 and the ISP 110, or an incorrect (or absent) connection from a user's computer (e.g., local device 125) to the primary transceiver 105 of Internet-access device 100 is responsible for improper operation.

In some examples, in addition to sending state telemetry to the Internet service provider 110, the secondary transceiver 115 may be capable of receiving and executing configuration commands (e.g., commands to change configuration parameters of the Internet-access device 100) or firmware updates from the Internet service provider 110. In such an example, the Internet-access device 100 may enforce certain security measures (e.g., requiring the user to approve any such configuration or firmware update via a button on the housing of the Internet-access device 100, or via an interface that may be served to a browser on the user's computer (e.g., local device 125) by the Internet-access device 100).

The secondary transceiver 115 may periodically (e.g., every 60 seconds, or some other period) transmit a presence signal (or "chirp" or "heartbeat"), which may include an identifier (e.g., a Media Access Control (MAC) identifier or other device identifier) of the secondary transceiver 115. All other transmissions made by the secondary transceiver 115 may also include such an identifier. The periodic presence signal may also include state telemetry regarding the state of the Internet-access device 100.

Figure 2:
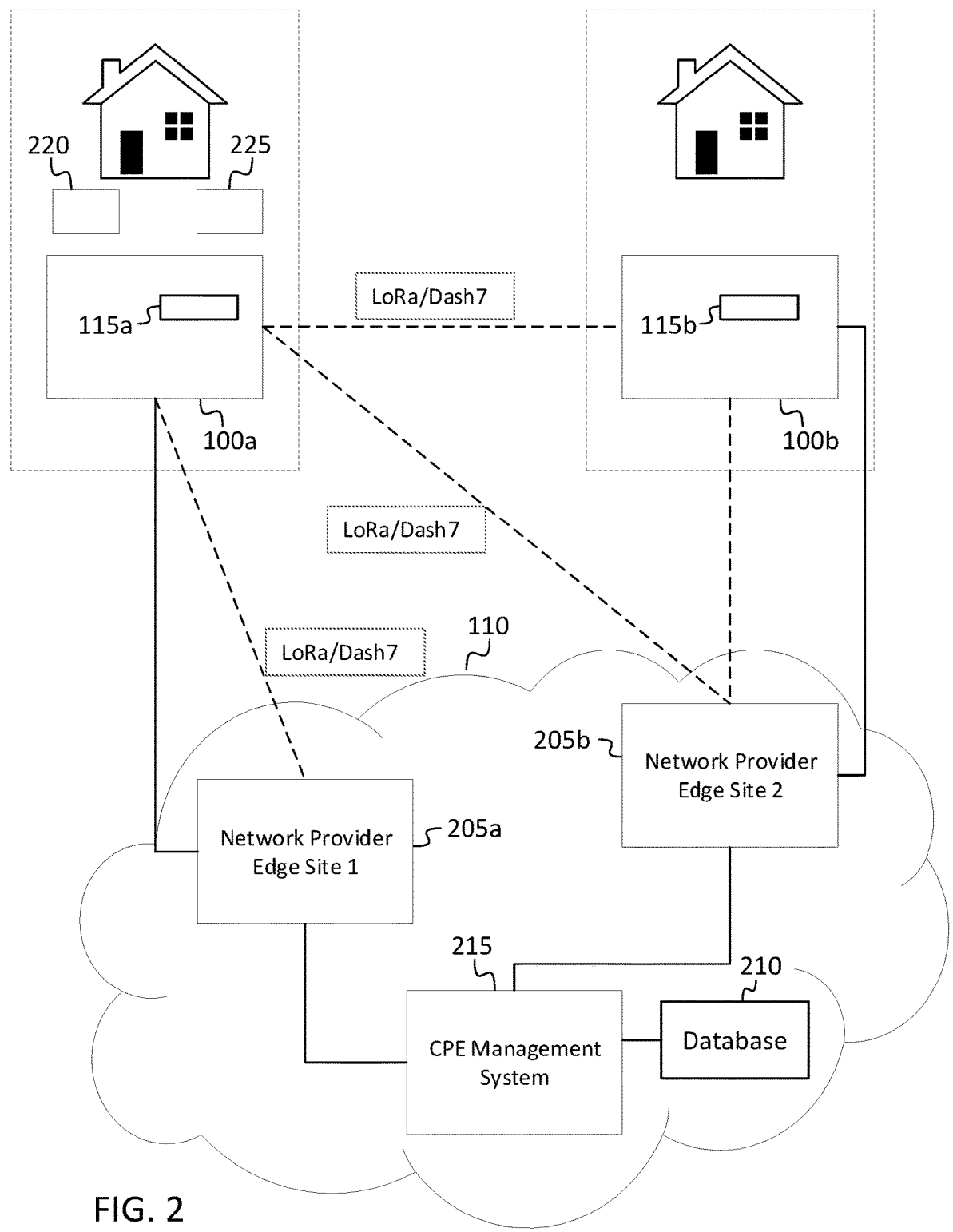
FIG. 2 is a block diagram of a network with secondary connections, according to an example of the present disclosure.

Referring to FIG. 2, if a first secondary transceiver 115a (the secondary transceiver of a first Internet-access device 100a) is within range of a first edge site 205a of the Internet service provider 110, the first edge site 205a may receive the periodic presence signal, and record (e.g., in a database 210 of Internet-access devices 100 and edge sites 205 through which they may be reached) (i) the identifier of the first secondary transceiver 115a, and (ii) an identifier of the first edge site 205a. If the first secondary transceiver 115a is also within range of a second edge site 205b of the Internet service provider 110, then the Internet service provider 110 may record (e.g., in the database 210) (i) the identifier of the first secondary transceiver 115a, and (ii) the identifier of the edge site (205a or 205b) that received a stronger signal from the first secondary transceiver 115a. In examples, first secondary transceiver 115a may comprise a secondary transceiver 115 as described above with respect to FIG. 1.

The Internet service provider 110 may also transmit, to the first secondary transceiver 115a, an acknowledgment. The acknowledgment may be used to configure transmissions via repeaters (as discussed in further detail below), or to set the scheduling of future transmissions by, and to, the first secondary transceiver 115a (e.g., to avoid collisions with transmissions of other transceivers, or to enable power savings by allowing the first secondary transceiver 115a to operate in a dormant state when no transmissions from the Internet service provider 110 are scheduled).

When the Internet-access device 100 is delivered (e.g., shipped) to the user, the Internet service provider 110 may store (e.g., in the database 210), a device identifier (which may be the identifier of the first secondary transceiver 115a) in association with a customer account identifier associated with the user. When the Internet service provider 110 subsequently receives a periodic presence signal from the first secondary transceiver 115a, it may store (e.g., in the database 210) (i) any state telemetry included in the periodic presence signal, and (ii) the radio path or radio paths via which the periodic presence signal was received. Each such radio path may be specified as (i) the identifier of the first secondary transceiver 115a, if the signal was received directly by an edge site 205a, 205b, or (ii) a list of identifiers of the secondary transceivers 115 that retransmitted the signal before it was received by an edge site 205a, 205b. For example, in FIG. 2, a signal from secondary receiver 115a may be received via a path that includes: (a) network provider edge site 1 205a; (b) network provider edge site 2 205b; and (c) both secondary receiver 115b and network provider edge site 2 205b. In some examples, a measure of signal strength at each point at which the signal was received along the radio path is stored along with each such path.

If the Internet service provider 110 subsequently receives an indication that a customer needs assistance with the first Internet-access device 100a, the Internet service provider 110 may identify (by correlating the customer with the device identifier through the customer account identifier) the first Internet-access device 100*a* as being the Internet-access device 100*a* associated with that customer, and retrieve from the database 210 (*i*) any stored state telemetry, associated with the first Internet-access device 100*a* (and with the customer), for use in troubleshooting, or (ii) a radio path that may be used to reach the first secondary transceiver 115*a*, to query the first Internet-access device 100*a* for state telemetry. The Internet service provider 110 may also (or instead) send a state query to the first Internet-access device 100*a*, via the edge site identified (in the database 210) as being suitable for contacting the first Internet-access device 100*a* (e.g., network provider edge site 1 205*a* or network provider edge site 2 205*b*). The secondary transceiver 115 may then respond with state telemetry (e.g., with additional or updated state telemetry, if state telemetry has already been sent in a periodic presence signal), as discussed above, to assist in remote troubleshooting.

If a first secondary transceiver 115*a* is out of range of all of the edge sites 205*a* or 205*b*, or if it is sufficiently distant that the signal level from it, at the nearest edge site 205*a* or 205*b*, is poor, another transceiver, e.g., a second secondary transceiver 115*b* (e.g., the secondary transceiver 115 of a second, nearby, Internet-access device 100*b*) may act as a repeater to relay messages back and forth between the first secondary transceiver 115*a* and (i) the edge site (e.g., network provider edge site 2 205*b*) or (ii) another repeater. In examples, second secondary transceiver 115*b* may comprise a secondary transceiver 115 as described above with respect to FIG. 1.

The path taken by messages sent between the first secondary transceiver 115*a* and the Internet service provider 110 may be selected, by a CPE management system 215 of the Internet service provider 110, based on signal strengths measured by the Internet service provider 110 and by the secondary transceivers 115 in the area. For example, the first secondary transceiver 115*a* may, when the first Internet-access device 100*a* is first delivered to the user's premises, transmit a first periodic presence signal, which may be received by the second secondary transceiver 115*b*. The second secondary transceiver 115*b* may (like all of the secondary transceivers 115) be configured to automatically retransmit (along with an indication of the signal strength with which it received it) the periodic presence signal of any secondary transceiver 115 for which it has not previously retransmitted a periodic presence signal. The second edge site 205*b* may then receive the periodic presence signal both (i) directly from the first secondary transceiver 115*a* and (after retransmission) from the second secondary transceiver 115*b*. If the signal strength of the repeated signal exceeds the signal strength of the directly received signal by a sufficient margin to justify burdening the second secondary transceiver 115*b* with the duty of acting as a repeater for the first secondary transceiver 115*a*, then the Internet service provider 110 may configure the first secondary transceiver 115*a* or the second secondary transceiver 115*b* accordingly.

For example, to configure the second secondary transceiver 115*b* as an uplink repeater (a repeater for transmissions destined for an edge site, e.g., 205*b*) for the first secondary transceiver 115*a*, the Internet service provider 110 may send a command, to the second secondary transceiver 115*b*, instructing it to retransmit all uplink transmissions it may receive from the first secondary transceiver 115*a*. To configure the second secondary transceiver 115*b* as a downlink repeater for the first secondary transceiver 115*a* (a repeater for transmissions destined for the first secondary transceiver 115*a*), the Internet service provider 110 may send, to the second secondary transceiver 115*b*, a command instructing it to retransmit any downlink transmissions it may receive that are addressed to the first secondary transceiver 115*a*. In such an example, the secondary transceivers 115 may act like a mesh or grid architecture, which may build implicit redundant paths, and provide a form of high availability of data transmissions.

In another example, each secondary transceiver 115 may be configured to include a destination address in each uplink transmission, and to retransmit, toward an edge device, any uplink transmission addressed to it. In such an example, the second secondary transceiver 115*b* may be made an uplink repeater for the first secondary transceiver 115*a* by (instead of reconfiguring the second secondary transceiver 115*b*) instructing the first secondary transceiver 115*a* to address all transmissions to the second secondary transceiver 115*b*. In some examples, downlink transmissions (transmissions originating in an edge site 205*a* or 205*b*) may be routed by including, in each downlink transmission, an ordered list of secondary transceivers 115 to be traversed (as repeaters), on the way to the eventual destination secondary transceiver, and each repeater may strip its own identifier from the list and retransmit the diminished message.

In addition to providing a link to the Internet-access device 100 for troubleshooting purposes, the secondary transceiver 115 of an Internet-access device 100 may act as a backup (e.g., as a low-capacity backup) connection to the Internet during outages in the connection to the primary transceiver 105. For example, a home may be equipped with an Internet-connected alarm system, that during ordinary operation streams video captured by security cameras and sends notifications of alarm conditions (e.g., the opening of a door or window, or the triggering of a smoke alarm) via the Internet. Although the secondary transceiver 115 may not support a data rate sufficient for streaming video, the Internet-access device 100 may be configured to forward lower-rate data from the alarm system (e.g., the notifications of alarm conditions) to the Internet through the secondary transceiver 115 (while dropping, e.g., video data packets). When providing backup Internet access, the secondary transceiver 115 may also forward other low-data packets, such as telemetry provided by an Internet-enabled thermostat 220 or an Internet-enabled refrigerator 225, each of which may be an example of a local device 125. Similarly, when a power failure occurs, the secondary transceiver 115 may be configured to send a notification to the Internet service provider 110, and the Internet service provider 110 may forward the notification to the user, e.g., via Short Message Service (SMS), email, or an automated call to the user's mobile phone.

In some examples, the secondary transceiver 115 is a BLUETOOTH™ transceiver, which may connect to the Internet service provider 110 through the user's mobile telephone, which may in turn be connected to the Internet service provider 110 through the Internet.

Figure 3A:
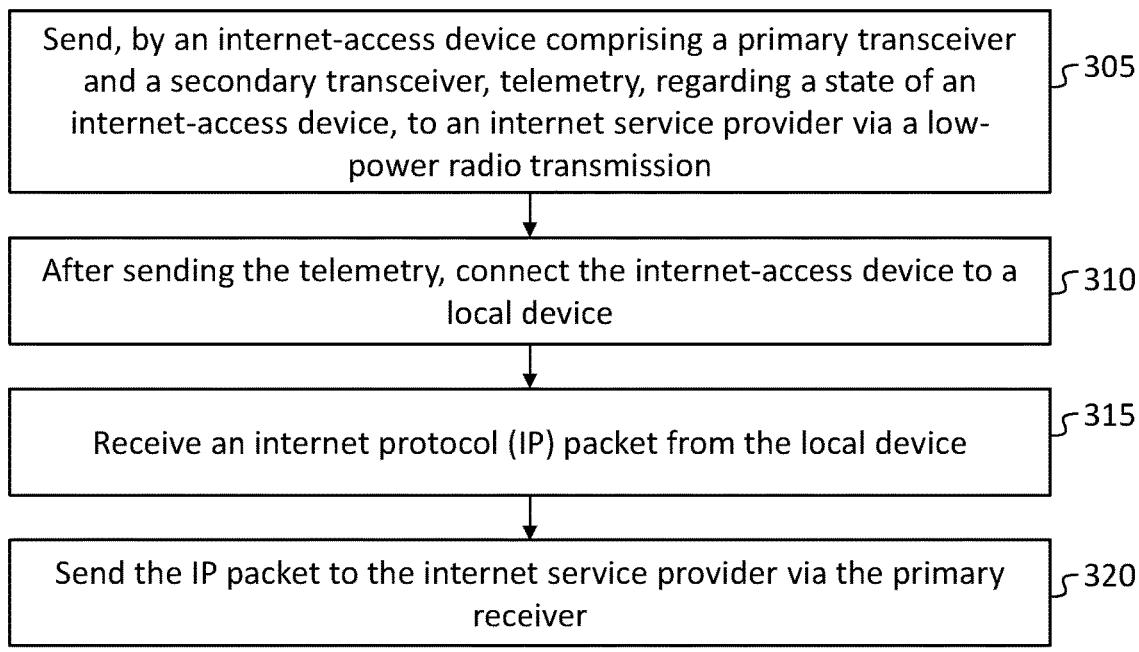
FIG. 3A is a flow chart of a method, according to an example of the present disclosure.

FIG. 3A is a flowchart of a method performed by an Internet-access device comprising a primary transceiver and a secondary transceiver, according to some examples described herein. In some examples, the method includes sending, at 305, by the secondary transceiver, telemetry, regarding a state of the Internet-access device, to an Internet service provider via a low-power radio transmission; after sending the telemetry, connecting, at 310, the Internet-access device to a local device; receiving, at 315, an Internet protocol (IP) packet from the local device; and sending, at 320, the IP packet to the Internet service provider via the primary receiver. The telemetry may include information selected from the group consisting of: (i) whether the Internet-access device is connected to an external power source, (ii) a signal level of a signal received, from the Internet service provider, by the primary transceiver, and (iii) whether any device is connected to the primary transceiver over a local area network.

Figure 3B:
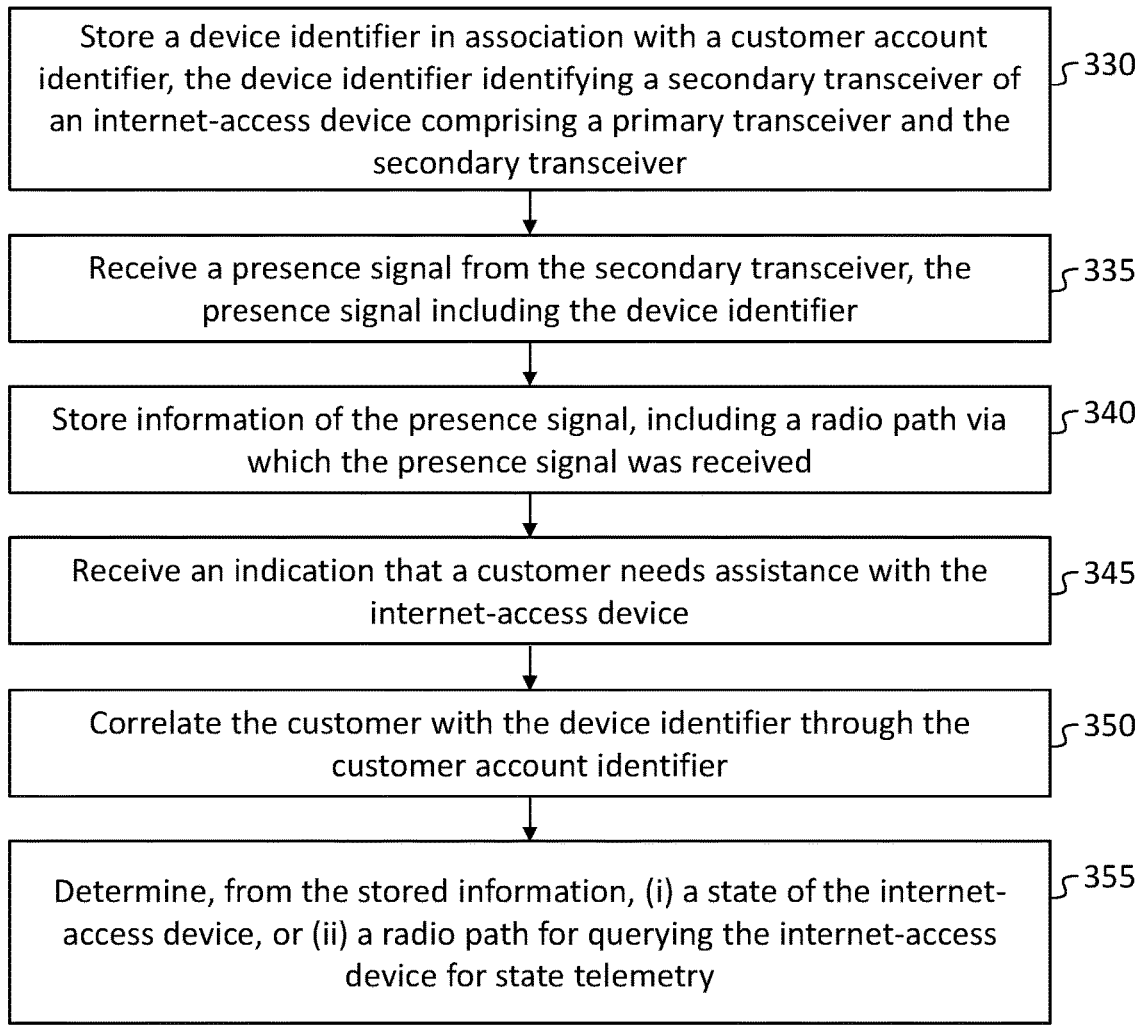
FIG. 3B is a flow chart of a method, according to an example of the present disclosure.

FIG. 3B is a flowchart of another method, according to some examples described herein. In some examples, a device identifier is stored, at 330, in association with a customer account identifier, the device identifier identifying a secondary transceiver of an Internet-access device comprising a primary transceiver and the secondary transceiver; a presence signal is receive, at 335, from the secondary transceiver, the presence signal including the device identifier; information of the presence signal, including a radio path via which the presence signal was received, is stored, at 340; an indication that a customer needs assistance with the Internet-access device is received, at 345; and the customer is correlated, at 350, with the device identifier through the customer account identifier. The method may further include determining, at 355, from the stored information, (i) a state of the Internet-access device, or (ii) a radio path for querying the Internet-access device for state telemetry.

Figure 4:
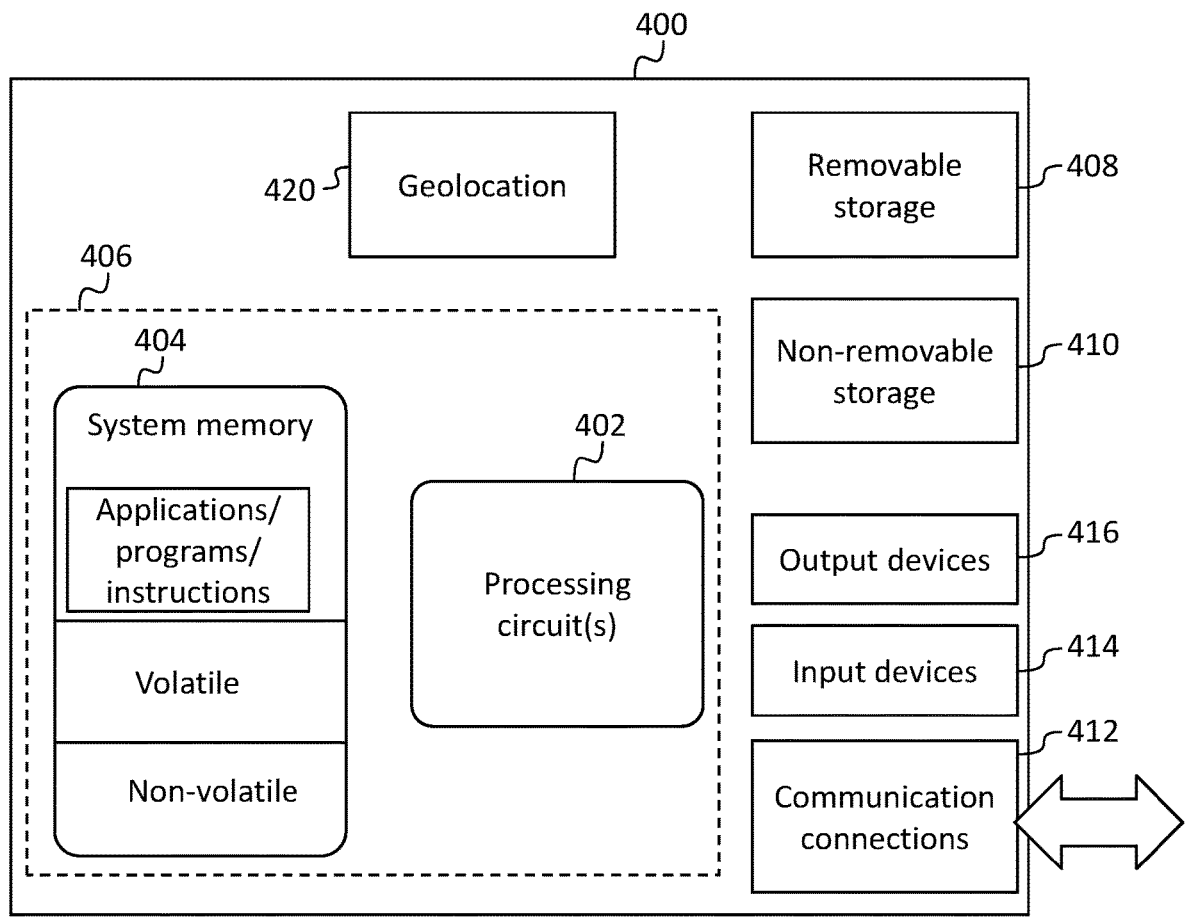
FIG. 4 is an operating environment, according to an example of the present disclosure.

FIG. 4 depicts an example of a suitable operating environment 400, portions of which may be used to implement an Internet-access device 100, transceivers 105 and 115, an edge site, the CPE management system 215, a user computing device, or other computing devices within the systems discussed herein. In its most basic configuration, operating environment 400 typically includes at least one processing circuit 402 and memory 404. The processing circuit may be a processor, which is hardware. Depending on the exact configuration and type of computing device, memory 404 (storing instructions to perform the methods disclosed herein) may be volatile (such as RAM), non-volatile (such as ROM, flash memory, etc.), or some combination of the two. This most basic configuration is illustrated in FIG. 4 by dashed line 406. The memory 404 stores instructions that, when executed by the processing circuit(s) 402, perform the processes and operations described herein. Further, environment 400 may also include storage (removable 408, or non-removable 410) including, but not limited to, solid-state, magnetic disks, optical disks, or tape. Similarly, environment 400 may also have input device(s) 414 such as keyboard, mouse, pen, voice input, etc., or output device(s) 416 such as a display, speakers, printer, etc. Additional communication connections 412 may also be included that allow for further communication with LAN, WAN, point-to-point, etc. Operating environment 400 may also include geolocation devices 420, such as a global positioning system (GPS) device.

Operating environment 400 typically includes at least some form of computer readable media. Computer readable media can be any available media that can be accessed by processing circuit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and tangible and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

As used herein, the word "or" is inclusive, so that, for example, "A or B" means any one of (i) A, (ii) B, and (iii) A and B. As used herein, when a method or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies.

Although exemplary embodiments of a system and method for providing a secondary link to customer premises equipment for Internet access have been specifically described and illustrated herein, many modifications and variations will be apparent to those skilled in the art. Accordingly, it is to be understood that a system and method for providing a secondary link to customer premises equipment for Internet access constructed according to principles of this disclosure may be embodied other than as specifically described herein. The invention is also defined in the following claims, and equivalents thereof.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. An Internet-access device, comprising:
   a primary transceiver; and
   a secondary transceiver,
   the primary transceiver being configured to connect a local device to an Internet service provider,
   the secondary transceiver being configured to send telemetry, regarding a state of the Internet-access device, to the Internet service provider.

2. The Internet-access device of claim 1, further comprising a battery, wherein the secondary transceiver is capable of operating solely on power from the battery.

3. The Internet-access device of claim 1, wherein the telemetry includes whether the Internet-access device is connected to an external power source.

4. The Internet-access device of claim 1, wherein the telemetry includes a signal level of a signal received, from the Internet service provider, by the primary transceiver.

5. The Internet-access device of claim 1, wherein the telemetry includes whether any device is connected to the primary transceiver over a local area network.

6. The Internet-access device of claim 1, wherein the secondary transceiver is a radio transceiver configured to operate at a frequency between 100 MHz and 1 GHz.

7. The Internet-access device of claim 1, wherein the local device is connected to the Internet-access device over a local area network that is enabled by the Internet-access device.

8. The Internet-access device of claim 1, wherein the secondary transceiver is configured to transmit a periodic presence signal comprising an identifier of the secondary transceiver.

9. The Internet-access device of claim 8, wherein the transmitting of the periodic presence signal comprises transmitting the periodic presence signal repeatedly, with a mean period between 10 seconds and 1000 seconds.

10. The Internet-access device of claim 1, wherein the secondary transceiver is configured, upon receipt of a periodic presence signal from a secondary transceiver of another Internet access device, to retransmit the periodic presence signal from the secondary transceiver of the other Internet access device.

11. The Internet-access device of claim 10, wherein the secondary transceiver is further configured to transmit an indication of the signal strength with which the periodic presence signal was received from the secondary transceiver of the other Internet access device.

12. The Internet-access device of claim 10, wherein the secondary transceiver is configured:
   to receive a command, from the Internet service provider, to operate as a repeater for the secondary transceiver of the other Internet access device, and,
   in response to receiving the command, to retransmit all transmissions received from the secondary transceiver of the other Internet access device.

13. The Internet-access device of claim 1, wherein the secondary transceiver is configured to transmit a packet, received by the Internet-access device from the local device.

14. The Internet-access device of claim 1, wherein the sending of telemetry comprises sending telemetry in response to a query received from the Internet service provider.

15. The Internet-access device of claim 1, wherein the sending of telemetry comprises sending telemetry in response to a loss of power from an external power source.

16. The Internet-access device of claim 1, wherein the Internet-access device is configured, in response to a notification, received by the secondary transceiver, of an outage in a connection between the Internet service provider and the primary transceiver, to respond, to an outbound request from a browser running on the local device, by serving a web page generated by the Internet-access device, the web page including a notification of the outage.

17. The Internet-access device of claim 1, wherein the Internet-access device is configured, in response to a command received by the secondary transceiver, to change a configuration parameter of the Internet-access device.

18. A method performed by an Internet-access device comprising a primary transceiver and a secondary transceiver, comprising:
   sending, by the secondary transceiver, telemetry, regarding a state of the Internet-access device, to an Internet service provider via a low-power radio transmission;
   after sending the telemetry, connecting the Internet-access device to a local device;
   receiving an Internet protocol (IP) packet from the local device; and
   sending the IP packet to the Internet service provider via the primary receiver.

19. The method of claim 18, wherein the telemetry includes information selected from the group consisting of:
   whether the Internet-access device is connected to an external power source;
   a signal level of a signal received, from the Internet service provider, by the primary transceiver; and
   whether any device is connected to the primary transceiver over a local area network.

20. A method, comprising:
   storing a device identifier in association with a customer account identifier, the device identifier identifying a secondary transceiver of an Internet-access device comprising a primary transceiver and the secondary transceiver;
receiving a presence signal from the secondary transceiver, the presence signal including the device identifier;
storing information of the presence signal, including a radio path via which the presence signal was received;
receiving an indication that a customer needs assistance with the Internet-access device;
correlating the customer with the device identifier through the customer account identifier; and
determining, from the stored information:
  a state of the Internet-access device, or
  a radio path for querying the Internet-access device for state telemetry.

\* \* \* \* \*